July 26, 1949.  E. G. DANNER  2,477,363

AQUARIUM HEATER

Filed June 10, 1948

INVENTOR.
EUGENE G. DANNER
BY
ATTORNEY

Patented July 26, 1949

2,477,363

UNITED STATES PATENT OFFICE 2,477,363

AQUARIUM HEATER

Eugene G. Danner, Brooklyn, N. Y.

Application June 10, 1948, Serial No. 32,061

4 Claims. (Cl. 219—41)

This invention relates to aquarium heaters, and particularly to a type of electric aquarium heater.

The main object of my invention is to provide an electric aquarium heater with an illumination means included within the envelope of the heater together with the heating element.

Another object is to provide such a combined heater and illuminating means for an indoor aquarium which is compact, portable and easily installed.

A further object is to have such combined electric heating and illuminating means in connection with an aquarium in which a small lamp is used capable of replacement when burned out.

It is also an object to make a combined electric aquarium heater and illuminator which is compact, waterproof and durable.

It is, of course, a practical object to provide convenient and economical means for heating and illuminating indoor aquariums which are substantially trouble proof, simple, and also reasonable in cost while being efficient in use.

Other objects and advantages of the invention will appear in further detail as the specification proceeds.

In order to facilitate comprehension of this invention for a proper appreciation of the salient features thereof, the invention is illustrated on the accompanying drawing forming a part hereof, and in which, Figure 1 is a perspective view of an aquarium with a combined heating and illuminating device embodying the invention mounted thereon in operative position;

Throughout the views, the same reference numerals indicate the same parts.

Figure 1:
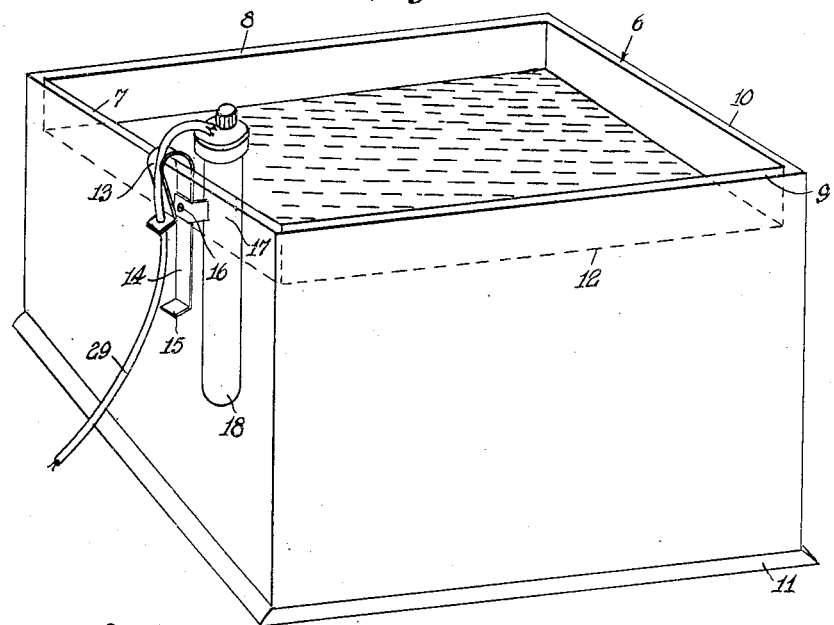
Figure 2:
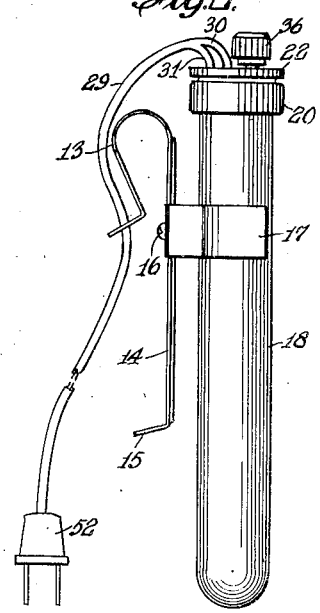
Figure 2 is a side elevation of the device with the bracket for attaching it to the aquarium in place thereon.
Figure 3:
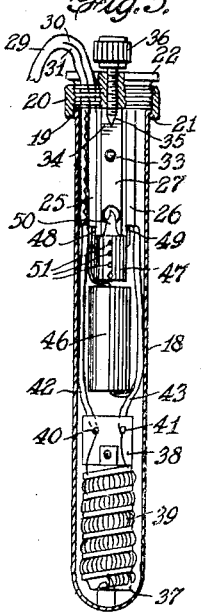
Figure 3 is a front elevation of the device of the invention with the supporting bracket removed to reveal details.
Figure 4:
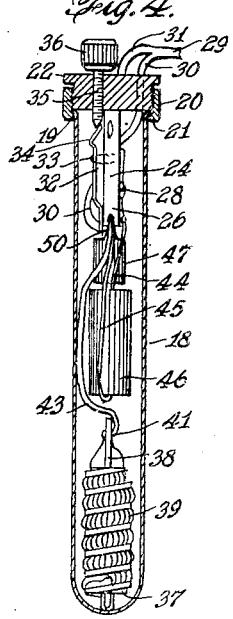
Figure 4 is a side elevation of the same device showing further details.

In connection with aquariums such as are found indoors in the house, for example, there are usually no such facilities at hand for heating and conditioning the water as may be found in large public aquariums, so that there has been a long felt need for devices for controlling the condition of smaller aquariums. After duly considering this problem, I have found it quite feasible to design means for heating the water conveniently and also providing a useful amount of illumination for the interior of the tank involved, as will now be set forth in detail.

Hence, in the practice of my invention, and referring again to the drawing, a tank used as an aquarium, indicated at 6 has the usual four glass walls or sides 7, 8, 9 and 10 secured upon the base or bottom 11, while water is contained within to an arbitrary level 12. Upon one wall 7 is mounted a supporting bracket 13 which is looped over the wall to form a depending portion 14 within the tank, to which is attached by a screw or small bolt 16 a clamp 17, the depending portion being spaced from the inside of the wall 7 by a bottom foot 15 integral with the portion 14. In the clamp is held a glass tube 18 forming an envelope for the device under consideration. The upper end of tube 18 terminates in a flange 19, beneath which is located an internally threaded ring 20 having an inwardly directed retaining flange 21 at the bottom for engaging beneath flange 19. The mentioned ring is preferably made of insulating material such as fibre or plastic, and cooperating therewith is a cap 22 of similar material having a threaded portion engaging with the internal threads of the ring in such fashion as to clamp the tube flange 19 between them and thereby fix the cap in position upon the tube as a closure therefor.

The cap forms likewise a support for a depending strip of insulating material 24 upon which are mounted two metal strips 25, 26, a further metal strip 27 upon the flat side of strip 24 being connected to the latter, and secured upon strip 24 by a screw 28. A double conductor cable 29 exteriorly of the tube has a pair of conductor elements 30 and 31 entering the tube through apertures in cap 22, element 31 connecting with metal strip 25 below the cap, while element 30 connects with a spring contact 32 upon the opposite side of strip 24 from metal strip 27, but having a projecting contact point 33 extending through an aperture in insulate strip 24 toward metal strip 27. The upper end of this spring contact is inclined at 34, a downwardly extending regulating screw 35 screwed through cap 22 extending into physical contact with said inclined upper end. The screw has a knob 36 above the cap by which to manipulate it and turn it down until it causes spring to move with its point 33 into contact with metal strip 27 and thereby make contact therewith. By this means, the side strip 26 will be brought into contact with the other conductor element 30, so that side strips 25 and 26 thus form terminals for both conductor elements 30 and 31.

Down within the lower end of tube 18 is located a refractory coil form 37 attached to a piece of insulating material 38 and having a heater coil 39 wound thereon with the ends of the coil brought to a pair of terminals 40, 41 upon member 38. The terminals are connected to the upper side strips 25, 26 by two short leads 42, 43, and connected in parallel with the latter are a pair of leads 44, 45 of a condenser 46 which may optionally be included to take care of sudden current surges.

However, above the condenser is located a combined socket and shield 47 having a pair of upwardly projecting contacts 48, 49 extending up into sliding contact with side strips 25 and 26. Within this socket shield is located a small electric lamp 50, while in one side of the shield is a series of small light emitting apertures 51, which may be modified to be a narrow slit, if desired. The lamp is thus connected in parallel with the heater coil and the condenser. When the control screw 35 is screwed up by means of knob 36, the contact spring 32 will withdraw its contact projection 33 from contact with strip 27 and thereby break the circuit of the lamp and heater coil. If the screw is turned down until the contact 33 of spring 32 is brought into contact with strip 27, the circuit is closed, and if then the plug 52 at the outer end of conductor cable 29 is plugged into the current mains in an outlet, the device will operate to heat the water in the tank and at the same time a limited amount of light will be communicated to the water to guide the fish in movement without subjecting them to glare. The illumination of the tank from within is thus independent of any illumination of the room in which the aquarium may be located.

Manifestly, variations may be resorted to and parts and features may be modified or used without others within the scope of the appended claims.

Having now fully described my invention, I claim:

1. A combined aquarium heating and illuminating device, including an elongated transparent envelope with a closed end, an insulating cap closing the other end having a pair of conductors extending through the cap into said envelope from an external current source, an insulating member within said envelope beneath said cap having a pair of side strips of metal, a connection between one of said conductors and one side strip, a contact member upon said insulating member connected to the other conductor, a second contact member upon said insulating member connected to the other side strip and disposed in position to be engaged electrically by the first contact member to close the circuit involved, a heater coil disposed within the lower end of the envelope having the two ends thereof connected to the two side strips, and an incandescent electric light bulb illuminating means also disposed within the envelope connected to said two side strips in parallel with said heating coil.

2. A heating and illuminating device according to claim 1, wherein the illuminating means includes a partly shielded socket removably connected to the two side strips and containing a small incandescent electric lamp bulb at least partly concealed by said socket.

3. A heating and illuminating device according to claim 1, wherein the illuminating means includes a combined shield and socket connected to the two side strips and containing a small electric lamp which is disposed beneath the insulating member, the socket and shield having a side opening for emitting a limited amount of light from the lamp therethrough.

4. A heating and illuminating device according to claim 1, wherein the cap has a control screw extending from the exterior thereof into contact with the first contact member in effective position to move said contact member into contact with the second contact member upon manipulating said screw in one direction and to cause said contact members to become separated when manipulated in the opposite direction, and a condenser connected to the side strips in parallel with the lamp and heating coil.

EUGENE G. DANNER.

REFERENCES CITED

The following references are of record in the file of this patent:

UNITED STATES PATENTS

| Number | Name | Date |
|---|---|---|
| 1,365,978 | Gallager | Jan. 18, 1921 |
| 1,416,872 | Quain | May 23, 1922 |
| 1,837,000 | Wertz | Dec. 15, 1931 |